United States Patent
Kim et al.

(10) Patent No.: US 7,306,688 B2
(45) Date of Patent: Dec. 11, 2007

(54) AMORPHOUS MARBLE FLOORING THROUGH TWO EMBO SYSTEM AND PROCESS OF MAKING THE SAME

(75) Inventors: Jang-Ki Kim, Seoul (KR); Keuk-Pil Bahng, Cheongju-si (KR)

(73) Assignee: LG Chem, Ltd. (KR)

( * ) Notice: Subject to any disclaimer, the term of this patent is extended or adjusted under 35 U.S.C. 154(b) by 467 days.

(21) Appl. No.: 11/020,816

(22) Filed: Dec. 22, 2004

(65) Prior Publication Data

US 2005/0189064 A1    Sep. 1, 2005

(30) Foreign Application Priority Data

Dec. 23, 2003  (KR) ...................... 10-2003-0095539
Dec. 23, 2003  (KR) ................. 20-2003-0039943 U

(51) Int. Cl.
*B32B 38/06*    (2006.01)
(52) U.S. Cl. ...................... 156/219; 156/209; 156/264; 156/553
(58) Field of Classification Search ...................... None
See application file for complete search history.

(56) References Cited

U.S. PATENT DOCUMENTS 2,260,453 A * 10/1941 Hartman ...................... 264/76
2,840,137 A *  6/1958 Wortz ........................ 264/37.3
2,917,781 A * 12/1959 Petry ............................ 264/76

FOREIGN PATENT DOCUMENTS

| DE | 4445429 | * | 4/1996 |
| JP | 9-193334 | * | 7/1997 |
| KR | 10-0249569 B1 | | 12/1999 |
| KR | 20-0343899 | | 2/2004 |

* cited by examiner

*Primary Examiner*—Jessica Ward
(74) *Attorney, Agent, or Firm*—Cantor Colburn LLP

(57) ABSTRACT

A synthetic amorphous marble flooring and a manufacturing method of the same are disclosed. The method includes the steps of kneading a synthetic resin compound with multi-colored spot color chips and primarily rolling the kneaded compound to manufacture a primarily rolled sheet, laminating the primarily rolled sheets while cutting the sheet to have a predetermined size and rotating the sheet, performing secondary rolling the laminated sheets by a low-temperature calendering to form wave patterns and rough surface on the sheets, and filling the rough surface of the secondarily rolled sheets by embossing in the length direction or any type of embossing using a first embossing unit of a double-embossing system to maintain uniform thickness, and flattening the surface by a secondary embossing unit of the double-embossing system. Thus, the synthetic marble flooring exhibiting amorphous marble patterns and excellent durability and a method of manufacturing the same are provided.

6 Claims, 1 Drawing Sheet

AMORPHOUS MARBLE FLOORING THROUGH TWO EMBO SYSTEM AND PROCESS OF MAKING THE SAME

TECHNICAL FIELD

The present invention relates to a synthetic amorphous marble flooring and a manufacturing method of the same, and more particularly to a synthetic resin amorphous marble flooring formed with an amorphous marble pattern using a double embossing system with low costs, different from the conventional method using calendering and pressing for post processing of the amorphous marble flooring, and a method of manufacturing the same.

BACKGROUND ART

Synthetic marble flooring, which exhibits excellent durability, an aesthetically pleasing appearance, and is highly decorative, is manufactured such that spot color chips of two or three different types are kneaded with a synthetic compound and hot-rolled, or a predetermined amount of the spot color chips having different colors are ejected and distributed on a prefab synthetic sheet and which is subjected to hot-press-rolling.

However, while the conventional manufacturing method is capable of changing the appearance of the flooring using various colors, it is limited in that the directionality of the marble patterns is fixed, and as a result, the appearance of the flooring is unnatural.

To avoid directionality of the marble pattern, Korean Patent No. 249,569 discloses a method of manufacturing an amorphous marble flooring, the directionality of the marble pattern thereof being removed by rotating the primarily calendered sheets by 90 degrees, laminating the same, and performing secondary calendering upon the same. However, according to Korean Patent No. 249,569, although it is possible to remove the directionality of the marble pattern, it is impossible to form a three dimensional marble pattern.

To overcome the above problems, Korean Utility Model Registration No. 343,899 forms a three-dimensional marble pattern within the flooring using an embossing system. However, the synthetic amorphous marble flooring manufactured in this fashion, upon post processing using an embossing system, is stained and the durability thereof is weakened.

To overcome the drawbacks of Korean Utility Model Registration No. 343,899, the inventors of the present invention have improved the stain-resistance and durability of amorphous marble flooring by installing an additional embossing unit to the conventional embossing system which serves to flatten and smooth the surface of the amorphous marble flooring. The inventors imparted a natural appearance upon the amorphous marble flooring by further drawing the amorphous marble flooring using friction ratio of embossing rolls, and improved the stain-resistance and durability by glossing the surface of the amorphous marble flooring using heat of steam supplied to a secondary embossing unit, so as to manufacture an amorphous marble flooring having markedly natural marble patterns.

DISCLOSURE

Technical Problem

Therefore, the present invention has been made in view of the above problems, and it is an object of the present invention to provide an amorphous marble flooring having greater stain-resistance and surface durability than that of the conventional amorphous marble flooring manufactured by the conventional embossing process, and a method of manufacturing the same.

It is the other object of the present invention to provide an amorphous marble flooring having drawn amorphous marble patterns and a glossy surface, and a method for manufacturing the same.

Technical Solution

In accordance with an aspect of the present invention, the above and other objects can be accomplished by the provision of a method of manufacturing an amorphous marble flooring, comprising the steps of kneading a synthetic resin compound with multi-colored spot color chips and primarily rolling the kneaded compound to manufacture a primarily rolled sheet, laminating the primarily rolled sheets while cutting the sheet to have a predetermined size and rotating the sheet, performing secondary rolling the laminated sheets by a low-temperature calendering at the temperature of 60 to 100° C. to form wave patterns on the surface of the sheets, and filling the rough surface of the secondarily rolled sheets, generated by low-temperature calendering together with the wave patterns, by a first embossing unit of a double-embossing system to maintain uniform thickness, and flattening the surface by a secondary embossing unit of the double-embossing system.

Preferably, a rotation device for rotating the primarily rolled sheet after cutting utilizes a vacuum suction rotation device, and the lamination is performed by a step type continuous lamination for continuously laminating the sheets in a step shape.

According to the present invention, a rotation device is installed on a manufacturing line, sheets are cut to a predetermined size, and the sheets are rotated and laminated in a step-shape, so that continuous process is enabled and high temperature rolling is implemented.

A vacuum suction for laminating base sheet of a vacuum suction type rotation device is performed by adding at least one of the substituted polyglycol ether as low-temperature processing additives, and a mixture of fatty alcohol partial esters and fatty acid esters to the synthetic resin compound, and maintaining the temperature 10 to 20° C. lower than the conventional processing temperature.

The vacuum rotation device cannot utilize vacuum suction for two reasons; firstly, because the base sheet is soft and malleable when the surface temperature of the base sheet after the primary rolling is higher than 140° C., and secondly because cracking may occur when the surface temperature of the base sheet is exceedingly low. The present invention adds low temperature processing additives to the synthetic resin compound so as to maintain the surface temperature of the base sheet 10 to 20° C. lower than the surface temperature of the conventional base sheet and to allow easy work.

The secondary embossing is performed by supplying 2 kg to 10 kg of steam to the second embossing unit so as to gloss a surface, and marble patterns of the surface of the base sheet are drawn by adjusting the friction ratio of the embossing units.

The first embossing unit comprises a roll which can form any type of embossing including the one in the length direction.

The present invention provides a method of manufacturing an amorphous marble flooring, including the steps of manufacturing a sheet by kneading spot color chips having various colors with a compound containing 500 to 650 parts by weight of calcium carbonate as a filler, 50 to 200 parts by weight of at least one of sepiolite, talcum and potassium silicate as auxiliary filler, 30 to 50 parts by weight of plasticizer (DOP), 3 to 10 parts by weight of an epoxy, 2 to 6 parts by weight of a Ba—Zn based stabilizer, 2 to 10 parts by weight of low temperature process additives, and a variety of pigments, with respect to 100 parts by weight of polyvinyl chloride (PVC), and primarily rolling the same, laminating the primarily rolled sheet while cutting the primarily rolled sheet into a sheet with a predetermined size and rotating the primarily rolled sheet, manufacturing a semi-manufactured amorphous marble flooring having wave patterns and a coarse surface by performing a secondary rolling in the laminating step using low-temperature calendering at a calender roll temperature of 60 to 100° C., maintaining the thickness of the secondary-rolled sheet uniform while filling the coarse surface via a first embossing unit of a double-embossing system, and flattening the surface of the secondary-rolled sheet by a secondary embossing unit of the double-embossing system.

The low temperature processing additive employed in the present invention is at least one selected from among substituted polyglycol ethers, a mixture of fatty alcohol partial esters and fatty acid esters, and is preferably a combination thereof.

Synthetic resins, which may be employed in the present invention, include polyvinyl chloride (PVC), but the present invention is not limited to the same, and any thermal plastic resin capable of being rolled can be used as the synthetic resin in the present invention.

Different from the conventional method using processes such as calendering and pressing as post processing for the amorphous marble flooring, the method according to the present invention post-processes the amorphous marble flooring using double-embossing units, wherein the first embossing unit fills the wave patterns and cracks formed by performing the low temperature calendering using embossing portions formed in the length direction or any type embossing roll, and a secondary embossing unit flattens the surface, so that the amorphous marble pattern can be formed.

In particular, the low temperature calendering process employed in the present invention maintains a low temperature, that is, 60 to 100° C., of the roll for applying high-temperature pressing and low-temperature calendering to the uniformly-laminated sheet having a specific thickness, based on a low temperature treatment capable of laminating the base sheet by lifting the base sheet using vacuum rotation device at temperatures below 140° C.

The present invention improves upon the conventional amorphous marble flooring by removing the conventional directional marble patterns so as to provide wave-shaped amorphous marble patterns using the high temperature rolling and the calendering, and to provide durability, glossy surface, and brilliant amorphous marble patterns by flattening the wave patterns and coarse surface.

The present invention relates to manufacture of an amorphous marble flooring having a flat and glossy surface and a brilliant amorphous marble pattern by manufacturing a semi-manufactured amorphous marble flooring having wave patterns and coarse surface using the double-embossing system. The wave patterns and the coarse surface are formed by high temperature rolling and calendering. In more detail, the wave patterns and the coarse surface are cracks (coarse surface) generated when the wave patterns and the hot base sheet are processed by the high-temperature rolling and the low-temperature calendering. The low-temperature processing additives used in the low-temperature treatment allow the process to be easily performed at a lower temperature than in the conventional process, and in more detail, the lamination of the base sheet is enabled in the vacuum suction.

An object of the present invention is to obtain unique, individualized wave patterns. The coarse surface is obtained by low-temperature calendering when forming the wave patterns. In other words, since the coarse surface is generated during low-temperature calendering, the surface is flattened by the double-embossing system so as to solve the problem of the coarse surface.

In particular, the present invention further includes the step of heating the surface of the amorphous marble flooring and processing the heated coarse surface by the double-embossing system when improving the coarse surface. After low temperature calendering, the temperature of the base sheet is rapidly decreased. To counteract the temperature decrease, the base sheet is heated to a temperature equal to or greater than 150° C. Any type of embossing roll (glass surface or embossing) can be employed in the embossing process.

According to the preferred embodiment of the present invention, as the semi-manufactured amorphous marble flooring having the wave patterns and the coarse surface (See FIG. 2) is manufactured by rolling at high pressure and calendering at low temperature, and is processed by the double-embossing system so as to manufacture the finished amorphous marble flooring (See FIG. 3), natural marble patterns are formed due to the marble drawing and the glossy effect, and the surface becomes flat after embossing so as to enhance the surface characteristics such as the durability and the wear resistance.

Advantageous Effects

As described above, according to the present invention, the flatness of the surface of the amorphous marble flooring is improved by enabling the vacuum suction by the rotation device when processing using the low temperature processing additives below 140° C. and applying the low-temperature calendering for maintaining the temperature of the calender roll 60° C. to 100° C. so as to form the wave patterns and the coarse surface. Moreover, the present invention flattens the coarse surface and provides a glossy surface and a brilliant and natural amorphous appearance by drawing the marble patterns when performing the secondary rolling. Since the method of manufacturing an amorphous marble flooring according to the present invention uses the embossing system instead of the conventional processes of flattening a surface of the amorphous marble flooring such as calendering, sanding, and pressing, costs for manufacturing can be reduced.

DESCRIPTION OF DRAWINGS

The above and other objects, features and other advantages of the present invention will be more clearly understood from the following detailed description taken in conjunction with the accompanying drawings, in which.

BEST MODE

Hereinafter, the amorphous marble flooring and method of manufacturing the same according the present invention will be described in detail.

Figure 1:
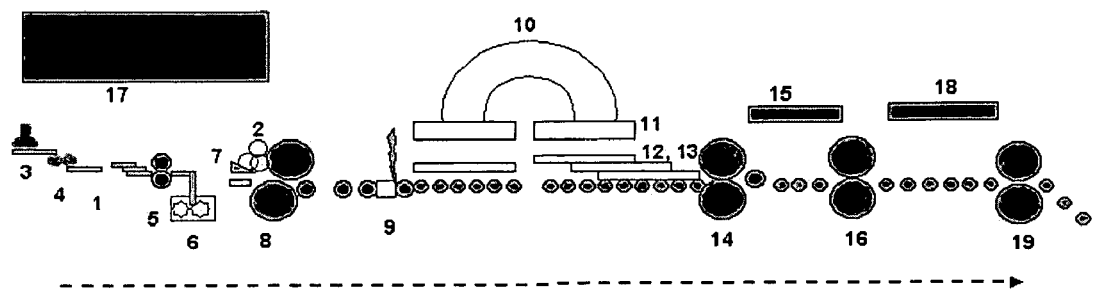
FIG. 1 is a schematic view illustrating the process of manufacturing an amorphous marble flooring according to the present invention.

FIG. 1 is a schematic view illustrating a process for manufacturing the amorphous marble flooring by calendering using double-embossing units according to the present invention. Broadly speaking, the process includes a raw material compounding process, a kneading process of homogeneously heating and pressing the compounded raw materials, a mixing process of uniformly mixing the raw materials, a calendering process of forming an amorphous marble pattern, and a double-embossing process of flattening the surface and providing the drawing effect and a glossy effect.

In more detail, in order to manufacture the highly decorative synthetic amorphous flooring according to the present invention, the synthetic amorphous flooring is manufactured such that polyvinylchloride (PVC) compound is kneaded with multi-colored spot color chips, a base sheet is manufactured by primarily rolling the kneaded compound, the base sheet is cut and rotated so as to be laminated in a step-shape, the laminated sheet is processed by secondary rolling using low temperature calendering, the surface cracks of the sheet having the wave patterns and the coarse surface are filled via a first embossing unit, and the surface of the sheet is flattened by a second embossing unit.

The composition of the base sheet 1 comprises 500 to 650 parts by weight of calcium carbonate as a filler, 50 to 200 parts by weight of at least one of sepiolite, talcum and potassium silicate as auxiliary filler, 30 to 50 parts by weight of plasticizer (DOP; dioctyl phthalate), 3 to 10 parts by weight of an epoxy, 2 to 6 parts by weight of a Ba—Zn based stabilizer, 2 to 10 parts by weight of low temperature process additives, and a variety of pigments, with respect to 100 parts by weight of polyvinyl chloride (PVC).

The spot color chip 2 is manufactured such that pigments are compounded into the PVC and the compounded sheet is rolled, and the rolled sheet is pulverized into 0.5 to 20 mm chips using a pulverizing machine, and hardness of the chips having variable hardness can be varied by varying the content of the plasticizer to be different from the content in the base sheet.

The manufacturing process of the amorphous marble flooring having stain-resistance and durability according to the present invention will be described in detail as follows.

First, a predetermined amount of liquid and powder raw materials are compounded and distributed, and the distributed raw materials are kneaded in a Banbury mixer 3 at 120 to 150° C. The kneaded raw materials are manufactured into a cake-shaped base sheet 1 using a mixing roll 4 at 100 to 130° C.

The base sheet 1 and the spot chips 2 having various colors are made into a sheet with a thickness of less than 3.0 mm by a joining calender 5, the sheet is pulverized and heated in an oven 17 at 200 to 250° C., the heated sheet 1 is rolled into a sheet with a thickness of 1.0 to 5.0 mm by a primary calender 8 at 110 to 150° C., the sheet is cut by a cutter 9, and the cut sheet is sucked and rotated by 90 degrees using a 90-degree-rotation device 10 and laminated 12 at a predetermined interval to have a step-shape. Here, "laminated at a predetermined interval", means to be laminated while maintaining the predetermined interval 13. The spot chips 2 may be independently injected during the primary calendering.

The cutter 9 serves to cut the primarily-rolled base sheet 1 to a predetermined length, and is constructed to cut the base sheet by the predetermined length by detecting the length of the cut sheet 1 using an optical sensor.

The rotation device 10 is a vacuum-90-degree rotation device, and includes a hollow quadrangular case and a large number of silicon caps 11 attached to the lower side of the case, so as to suck the primarily-rolled base sheet 1 using the vacuum caps 11 at vacuum pressure of 2 to 20 kg/cm$^2$, when the sheet 1 arrives at a desired position. The sucked base sheet 1 is laminated (See 12 in FIG. 1) while being rotated along the rails, and is supplied to the secondary calender 14.

Meanwhile, the primarily-rolled base sheet 1 is manufactured by kneading and rolling the compounded PVC and the spot color chips 2, and is marbled in the length direction.

Further, it is preferred to maintain a laminating interval of 100 to 500 mm after the rotation by 90 degrees. The pattern of the marble is varied according to the laminating interval and the number of the laminated layers, in other words, if the interval and the number of the laminated layers is small, the desired amorphous marble cannot be obtained because marble patterns are slightly shifted in the length direction in the directional marble pattern when the primarily formed marble is secondarily rolled after the rotation by 90 degrees.

The amount of laminate base sheets 1 depends on the thickness of the sheet 1 and the lamination interval 13, and preferably 2 to 10 sheets are laminated.

These laminated sheets are calendered by the secondary calender 14 at a low temperature of 60 to 100° C., so that the semi-manufactured marble flooring having the wave patterns and coarse surface is manufactured. At this time, the marbling formed in the length direction is rotated 90 degrees and changed into natural amorphous marble, and the base sheet 1 and the spot color chips 2 are naturally harmonized with each other. The thickness of the secondary rolled sheet is maintained at 2.5 to 4.5 mm.

The flooring exhibiting the durability and the marked amorphous marble patterns is manufactured such that the semi-manufactured flooring, passed through the secondary calender 14 and manufactured by high pressure rolling and low-temperature calendering, is heated by a first heater 15 (to a temperature equal to or higher than 150° C.), the coarse surface thereof is filled in along the length direction by the first embossing unit 16, the semi-manufactured flooring is heated again by a second heater 18 (130 to 150° C.), a second embossing is applied to provide the glossy surface of the semi-manufactured flooring by supplying steam (2 to 10 kg) to the second embossing unit 19 including double-embossing rolls, the friction ratio (5 to 20%) of the embossing units is adjusted to increase the force applied to the base sheet so as to draw the surface of the semi-manufactured flooring, and the surface of the semi-manufactured flooring is flattened.

Figure 2:
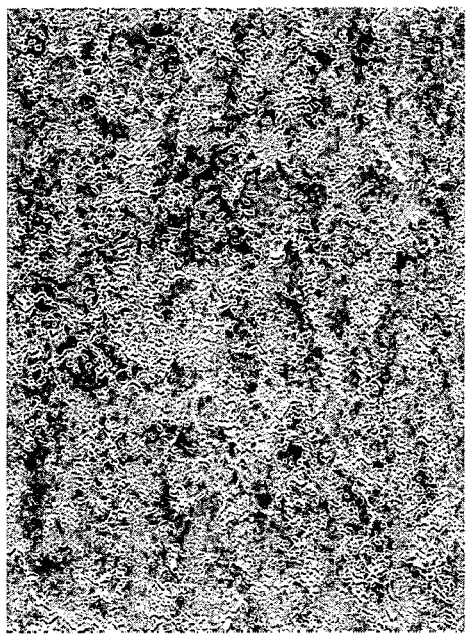
FIG. 2 is a photograph of a semi-manufactured amorphous marble flooring according to the present invention.

FIG. 2 is a photograph of the semi-manufactured amorphous marble flooring according to the present invention. As shown in the drawing, the wave patterns and the coarse appearance are formed by the low-temperature calendering, and the multi-colored spot color chips are amorphously inserted into the base sheet by pressing.

Figure 3:
FIG. 3 is a photograph of an amorphous marble flooring according to the present invention using double-embossing system.

FIG. 3 is a photograph of the amorphous marble flooring according to the present invention. As shown in the drawing, the amorphous marble flooring according to the present invention has a flat surface and marked amorphous natural marble patterns by processing the semi-manufactured amorphous marble flooring in FIG. 2 using the double-embossing system so as to have a glossy surface and the drawn marble patterns.

Figure 4:
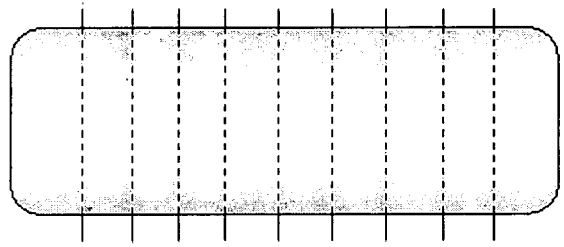
FIG. 4 is a schematic view illustrating a first embossing unit used in the present invention.

FIG. 4 is a schematic view of the first embossing unit utilized in the present invention. As shown in the drawing, the first embossing unit is formed with emboss portions (or any type embossing roll) in the length direction (indicated by dotted lines) and fills the cracks generated by the low-temperature calendering.

Mode for Invention

In order to manufacture the amorphous natural marble flooring using double-embossing system, a predetermined amount of respective liquid and powder raw materials is compounded and distributed. The raw materials uniformly distributed are kneaded in a Banbury mixer 3 at 120 to 150° C. by a screw, and a cake-shaped base sheet 1 is manufactured at 100 to 130° C. by using a mixing roll 4.

A sheet, having a thickness of less than 3 mm, is manufactured by joining the base sheet 1 and the multi-colored spot chips 2 using a joining calender 5. The joined sheet is pulverized and heated in an oven 17 at 200 to 250° C. A sheet having a thickness of 1.0 to 5.0 mm is manufactured by the first calender 8 at 110 to 150° C., and cut to a predetermined size. The cut sheet is rotated and laminated 12 by a vacuum cap 11 of the rotation device 10. Two to ten sheets are then laminated in a regular interval according the marble pattern.

The laminated sheet passes through the second calender 14 at 60 to 100° C. so as to manufacture the semi-manufactured sheet having a thickness of 2.5 to 4.5 mm and the wave patterns and the coarse surface by the high pressure rolling and the low temperature calendering. The semi-manufactured sheet, after passing through the second calender 14, is heated by the first heater 15, and the embossing portions formed in the length direction are applied thereto so as to fill in the coarse surface and provide a uniform thickness to the semi-manufactured sheet. The semi-manufactured sheet is heated again by the second heater 18 and the secondary embossing is performed by supplying 2 to 10 kg of steam to the second embossing unit 19, thus producing a glossy surface. Simultaneously, the marble patterns of the surface of the semi-manufactured sheet are drawn and the surface is flattened by adjusting the friction ratio (5 to 20% friction ratio) of the embossing units, so that the flooring exhibiting durability and the marked amorphous marble patterns is manufactured.

COMPARATIVE EXAMPLE

In order to manufacture the flooring exhibiting amorphous and three-dimensional patterns by using double-embossing system, a predetermined amount of respective liquid and powder raw materials is compounded and distributed. The raw materials uniformly distributed are kneaded in a Banbury mixer 3 at 120 to 150° C. by a screw, and a cake-shaped base sheet 1 is manufactured at 100 to 130° C. by using a mixing roll 4.

A sheet, having a thickness of less than 3 mm, is manufactured by joining the base sheet 1 and the multi-colored spot chips 2 using a joining calender 5. The joined sheet is pulverized and heated in an oven 17 at 200 to 250° C. A sheet having a thickness of 1.0 to 5.0 mm is manufactured by the first calender 8 at 110 to 150° C., and cut to a predetermined size. The cut sheet is rotated and laminated 12 by a vacuum cap 11 of the rotation device 10. Two to ten sheets are then laminated in a regular interval according the marble pattern.

The laminated sheet passes through the second calender 14 at 60 to 100° C. so as to manufacture the semi-manufactured sheet having 2.5 to 4.5 mm thickness and the wave patterns. The semi-manufactured sheet, passed through the second calender 14, is heated by the first heater 15, and the embossing portions 16 are applied thereto. Thus, the amorphous marble flooring exhibiting a smooth surface and three-dimensional wave patterns is manufactured.

The amorphous marble flooring manufactured in the preferred embodiment of the present invention has about 20% improved stain-resistance and about 30% improved durability as compared to the flooring manufactured in the comparative example.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of manufacturing an amorphous marble flooring, comprising the steps of:
    kneading a synthetic resin compound with multi-colored spot color chips and primarily rolling the kneaded compound to manufacture a primarily rolled sheet;
    cutting the primarily rolled sheet into a plurality of sheets having a predetermined size;
    rotating the plurality of sheets;
    laminating the plurality of rotated sheets to form laminated sheets;
    secondarily rolling the laminated sheets by a low-temperature calendering at the temperature of 60 to 100° C. to form wave patterns and a rough surface on the surface of the sheets; and
    filling the rough surface of the secondarily rolled sheets, generated by low-temperature calendering together with the wave patterns, by a first embossing unit of a double-embossing system to maintain uniform thickness, and flattening the surface by a secondary embossing unit of the double-embossing system.

2. The method as set forth in claim 1, wherein the primarily rolled sheets are rotated with a vacuum suction rotation equipment, and the primarily rolled sheets are laminated by a step type continuous lamination for continuously laminating the sheets in a step shape.

3. The method as set forth in claim 1, wherein the synthetic resin compound is added with at least one of substituted polyglycol ether and a mixture of fatty alcohol partial esters and fatty acid esters to maintain processing temperature by 10 to 20° C. lower than conventional processing temperature.

4. The method as set forth in claim 1, wherein the secondarily rolled sheets are flattened by a secondary embossing unit with supplying steam so as to gloss the surface, and marble patterns of the surface are drawn by adjusting the friction ratio of the embossing units.

5. The method as set forth in claim 1, wherein the first embossing unit comprises a roll which can form any type of embossing including one in the length direction.

6. A method of manufacturing an amorphous marble flooring, comprising the steps of:
    kneading a synthetic resin compound containing 500 to 650 parts by weight of calcium carbonate as a filler, 50 to 200 parts by weight of at least one of sepiolite, talcum and potassium silicate as auxiliary filler, 30 to 50 parts by weight of plasticizer, 3 to 10 parts by weight of an epoxy, 2 to 6 parts by weight of a Ba—Zn based stabilizer, 2 to 10 parts by weight of a low temperature process additive, and a variety of pigments, with respect to 100 parts by weight of polyvinyl chloride, with multi-colored spot color chips and primarily rolling the kneaded compound to manufacture a primarily rolled sheet;

cutting the primarily rolled sheets into a plurality of sheets having a predetermined size;

rotating the plurality of sheets;

laminating the plurality of rotated sheets to form a laminated sheet;

secondarily rolling the laminated sheets by a low-temperature calendering at the temperature of 60 to 100° C. to form wave patterns and a rough surface on the sheets; and filling the rough surface of the secondarily rolled sheets by a first embossing unit of a double-embossing system to maintain uniform thickness, and flattening the surface by a secondary embossing unit of the double-embossing system.

* * * * *